United States Patent [19]

Carre et al.

[11] Patent Number: 5,037,701

[45] Date of Patent: * Aug. 6, 1991

[54] PROCESSES FOR PRODUCING COLORED GLASS OR GLASS-CERAMIC ARTICLES BEARING A NON-STICK COATING, COMPOSITIONS FOR CARRYING OUT SAID PROCESSES, AND RESULTANT COLORED ARTICLES

[75] Inventors: Alain R. E. Carre, Le Chatelet en Brie; Francoise M. M. Roger, Avon, both of France

[73] Assignee: Corning Incorporated, Corning, N.Y.

[*] Notice: The portion of the term of this patent subsequent to Oct. 9, 2007 has been disclaimed.

[21] Appl. No.: 558,812

[22] Filed: Jul. 27, 1990

Related U.S. Application Data

[63] Continuation-in-part of Ser. No. 288,689, Dec. 22, 1988, Pat. No. 4,961,996.

[30] Foreign Application Priority Data

Jan. 5, 1988 [FR] France .............................. 88 00025

[51] Int. Cl.$^5$ ........................ B32B 7/04; B32B 31/06
[52] U.S. Cl. .................................... 428/420; 428/421; 428/429; 428/435; 428/447; 428/448; 428/473.5
[58] Field of Search ............. 428/421, 422, 447, 473.5, 428/435, 448, 429, 420; 528/183; 427/399

[56] References Cited

U.S. PATENT DOCUMENTS

| | | | |
|---|---|---|---|
| 3,260,691 | 7/1966 | Lavin et al. | 528/183 X |
| 3,558,345 | 1/1971 | Baum et al. | 428/422 |
| 4,329,399 | 5/1982 | Swerlick | 428/473.5 X |
| 4,353,950 | 10/1982 | Vassilion | 428/473.5 X |
| 4,562,119 | 12/1985 | Darms et al. | 428/473.5 X |
| 4,778,727 | 10/1988 | Tesoro et al. | 428/473.5 X |
| 4,808,473 | 2/1989 | Brooks | 428/473.5 X |
| 4,961,996 | 10/1990 | Carre et al. | 428/421 |

*Primary Examiner*—Thomas J. Herbert, Jr.
*Attorney, Agent, or Firm*—S. R. Christian; A. L. Michaelsen

[57] ABSTRACT

The invention relates to articles with a non-stick coating. It relates in particular to an article consisting of a substrate whose surface has -OH groups, and of at least one non-stick polymer layer, said article having also, applied between said substrate and said non-stick polymer layer, a layer which is obtained by making an appropriate bifunctional organosilane react with a polyamic-acid precursor of polyamide-imide and with -OH groups of the substrate surface, then drying and converting said polyamic-acid into a polyamide-imide by heating at an appropriately high temperature. The invention also provides processes and compositions to make non-stick glass and glass-ceramic cookware having clear, vivid, brilliant, attractive colors and stable and durable decorating patterns. Said coloring is achieved by precoating the substrate surface with a polyimide resin containing colored pigment, and preferably, an organosilane.

7 Claims, No Drawings

PROCESSES FOR PRODUCING COLORED GLASS OR GLASS-CERAMIC ARTICLES BEARING A NON-STICK COATING, COMPOSITIONS FOR CARRYING OUT SAID PROCESSES, AND RESULTANT COLORED ARTICLES

This is a continuation-in-part of U.S. Pat. Application Ser. No. 07/288,689, filed Dec. 12, 1988, now U.S. Pat. No. 4,916,996.

The present invention sets forth a process for producing colored articles consisting of a transparent glass or glass-ceramic substrate and of at least one layer of a non-stick polymer whose adhesion to the aforesaid article and durability are improved, to said articles and to a composition for carrying out said process.

Non-stick cooking utensils having good release properties toward food are usually coated with fluorocarbon polymers (polytetrafluoroethylene, PTFE, fluorinated ethylene-propylene copolymer, FEP, etc.) or with polysiloxanes (silicone resins).

Gritblasting of the articles to be coated is the usual surface treatment recommended for metallic substrates such as aluminum or cast iron, in order to develop a mechanical anchoring of the non-stick coating into the substrate roughness. However, when the substrate is glass or glass ceramic, gritblasting may not be suitable or desired, particularly when a PTFE coating is used. This is because the polymer/substrate is, in use, rapidly exposed to water and, due to the porosity of the PTFE coating, detergents and grease, the adhesion of the coating to the substrate, which is mainly a kind of anchoring, is not sufficient to avoid staining or delamination on the aforesaid interface. The damage is particularly visible when the substrate is a transparent glass, such as PYREX brand cookware.

For an identical purpose, CORNING INCORPORATED has disclosed an effective surface treatment for polyphased glasses and glass ceramics including a selective chemical etching (U.S. Pat. No. 4,683,168).

Also for the identical purpose of improving the adhesion of the non-stick coating to the substrate of the article to be coated, it was disclosed in U.S. Pat. No. 3,555,345, to use aminoalkyltrialkoxysilanes as coupling agents applied on the substrate before application of the non-stick coating. Typically the glass substrate is dipped into a diluted solution of the silane coupling agent for sufficient time, approximately 5 minutes to 4 hours, so as to have hydrolysis of the alkoxy groups, with condensation of the resulting —OH groups with the silanol (≡SiOH) groups existing at the glass surface (see E.P. PIUEDDEMAN, Silylated Surfaces, edited by D.E. Leyden and W. Collins, Gordon and Breach Science Publishers, N.Y., 31, 1978). The aminoalkyl groups have a high bonding interaction with the organic coating. Nevertheless, for the condensation reaction to develop sufficiently, it is necessary for the substrate surface to be exempt from grease or other organic pollutants. Consequently, the surface to be coated has to be thoroughly cleaned with a detergent or an organic solvent, such as alcohol, acetone, and the like, then dried, to insure that silanol groups are present on the aforesaid surface, which process is, on an industrial scale, a serious inconvenience. Moreover, this process is valid only for glass substrates.

Fluorocarbon (PTFE) coatings are generally porous and are, in use, prone to staining due to the penetration of fat or food in their porosity. Manufacturers of fluorinated polymer coatings make this staining less visible by supplying dark colored coating compositions (dark grey, black, brown).

Nevertheless, transparent glass articles coated after gritblasting with a PTFE non-stick coating are subject to a supplementary staining phenomenon resulting from the diffusion of detergents, fat and the like through the non-stick coating to the glass surface. These aspect damages are visible, for example, from the external side of a PTFE-coated PYREX cookware after a few uses.

Besides, due to the glass transparency, coating of PYREX cookware with the non-stick compositions presently supplied by manufacturers (E.I. DuPont de Nemours and Co., WHITFORD CORPORATION, etc.) lead to articles exhibiting externally the color of the non-stick coating, that is, as mentioned above, usually dark and non-attractive.

A solution for these problems can be strong coloration of the glass substrate.

Colored glass can be obtained for instance by adding oxides of transition metals (V, Cr, Mn, Fe, Co, Ni, Cu) to the glass composition or by introducing reducible ions of noble metals (Cu, Au, Ag, Pt) (see for example J. ZARZYCKI, "Les verres et l'etet vitreux", Masson, Paris, 1982). In this case, the bulk of the glass is entirely colored. These processes are not very versatile given that a particular color of the glass requires a particular glass composition.

There is consequently a need for a process allowing a good adhesion between a non-stick coating and a substrate, and being simpler to operate.

SUMMARY OF THE INVENTION

The present invention sets forth a process to manufacture an article consisting of a substrate whose surface has —OH groups and of at least one non-stick polymer layer covering on said surface at least in part. The process comprises applying to at least one part of the surface a polyamic-acid precursor of polyamide-imide and an organosilane with two types of functional groups; one of them being reactive with the —OH groups of the substrate surface, the other type being reactive with the polyamic-acid, said polyamic-acid and silane being applied as a mixture in one layer, or one application, or successively, first the silane and secondly the polyamic-acid. The structure is then heated up to an appropriate temperature, the polyamic-acid is dried and converted into a polyamide-imide. Finally, the non-stick coating or coatings are applied.

The invention also sets forth an article consisting of a substrate whose surface has —OH groups and of at least one layer of a non-stick polymer covering at least partially said surface, the article being characterized in that in addition it contains, between aforesaid substrate and non-stick polymer layer, a layer which is the product resulting from the reaction of an organosilane with two types of functional groups; one of them being susceptible to react with the polyamic-acid, said reaction being with a polyamic-acid precursor of polyamide-imide and with the —OH groups of the substrate surface, and the other type being susceptible to react with the polyamic-acid.

The invention sets forth the application on the colorless glass or glass-ceramic of a first polymer layer (pre-coating) having good barrier properties towards detergents and fat and having a suitable coloration to give to the finished article, with its non-stick coating, a commercially attractive and durable aspect. This colored precoating also displays a good adhesion ability toward the glass substrate and the non-stick coating.

The application of multi-colored precoating being possible, elaborated decorating effects can also be obtained.

More precisely, the present invention also relates to a process for producing colored articles consisting of a transparent glass or glass-ceramic substrate and of at least one layer of a non-stick polymer covering at least partially said substrate, characterized by: (A) gritblasting the portion of the substrate surface to be coated; (B) applying on that portion a pigmented polyimide resin; (C) drying and converting said pigmented polyimide resin into a pigmented solid film by heating at high temperature; and then (D) applying said non-stick layer.

The present invention relates also to a composition useful for carrying out said process, characterized in that it consists of: (1) a polyimide resin; and (2) a colored pigment allowing the development of a clear, vivid, brilliant, attractive color.

The present invention relates further to another process for producing a colored article consisting of a transparent glass or glass-ceramic substrate and at least one layer of a non-stick polymer covering at least partially said substrate, characterized by: (A) applying, on the portion of the substrate surface to be coated, a mixture of a pigmented polyimide resin and of an organosilane having two types of functional groups, one of them reacting, after hydrolysis, with -OH groups of the substrate surface, the other being reactive with the polyimide resin; (B) drying and converting the resultant silylated pigmented polyimide resin into a pigmented solid film by heating at high temperature; and then (C) applying said non-stick layer. The present invention also relates to a composition useful for carrying out said other process, characterized in that it consists of: (1) a polyimide resin; (2) a colored pigment allowing the development of a clear, vivid, brilliant, attractive color and stable and durable decorating effects; and (3) an organosilane with two types of functional groups; one of them being reactive, after hydrolysis, with —OH groups of the substrate surface and the other being reactive with said polyimide.

The present invention further relates to an article consisting of a transparent glass or glass-ceramic substrate, and of at least one layer of a non-stick polymer covering at least partially said substrate, characterized by the fact that it contains also, applied between said substrate and said non-stick polymer, a pigmented polyimide layer; as well as to such an article wherein said pigmented polyimide layer further comprises an organosilane chemically bound to -OH groups of the substrate surface and to said polyimide layer.

The present invention allows cookware articles to be coated with a non-stick coating, while also exhibiting externally clear, vivid, brilliant, attractive colors and durable decorations non-sensitive to staining.

These and additional objects, features and advantages, of the present invention will become apparent to those skilled in the art from the following detailed description.

DESCRIPTION OF THE PREFERRED EMBODIMENT

Synthesis of polyamide-imide is described in, for example, "HEAT-RESISTANT POLYMERS", J.P. CRITCHELY, G.J. KNIGHT and W.W. WRIGHT, Plenum Press, N.Y., 207, 1983.

The polyamic-acid precursors will be preferably used, for safety and antipollution reasons, as aqueous compositions. Such compositions are described in French Patent 1,460,157, applied on November 10, 1965 by Imperial Chemical Industries, where further details can be found. In those aqueous compositions, the polyamic-acid is found as a salt either of ammonium or of an organic base. The conversion into a polyamide-imide is usually made by heating.

An example of a polyamide-imide prepolymer composition, commercially available is code 8470 A XYLAN from Whitford Plastics Ltd. of Brindley 86, Astmoor, Runcorn, Chesire, WA7lPF, Great Britain and from Whitford Corporation of West Chester, PA 19381, USA.

If desired, polyamic-acid solution in organic solvents could be used. One familiar with the art can easily find, in the plentiful published literature dedicated to polyamic-acids and to polyamides-imides, details about preparation of such solutions in an organic solvent. The following two patents are quoted only as examples: British Patent 898,651 and U.S. Pat. No.3,260,691.

In order to obtain decorating effects for transparent substrates such as the substrate material found in PYREX and VISION cookware, suitable pigmentation of the polyamide-imide prepolymer allows the color of the first layer to be visible through the transparent substrate.

The organosilane to be used must have two types of functional groups. One of those types must be reactive with the —OH groups present at the surface of the substrate to be coated, and possibly belonging to silanol groups or to Me—OH groups where Me is a metal. An example of groups of this type is the hydroxy group. Nevertheless, since hydroxysilanes are not very stable, alkoxysilanes are preferred, and they have to be hydrolyzed into hydroxysilanes just when they are used or a short time before. The other type must be reactive with the polyamic-acid. An example of such groups, is the amino group.

Among the useful organosilanes are consequently the amino or polyamino-silanes. Among those, the preferred ones are, thus far, gamma-aminopropyltriethoxysilane, gamma-aminopropyltrimethoxysilane, and N-(beta-aminoethyl)-gamma-aminopropyltrimethoxysilane, which have the advantage of being approved by the U.S. F.D.A., which is important when the final articles are intended for cooking usage. The functional silane is more easily used as an aqueous or alcoholic solution, added shortly before use (maximum 1 hour) to the aqueous solution of polyamic-acid.

As guidance, the silane amount can be 1 to 10% by volume of the total composition, preferably 1 to 5%. As a variation, the silane and the polyamic-acid can be applied successively on the substrate to be coated. The dry extract of the final composition including resin and pigments, is usually between 10 and 22% by volume. The pigments are those usually included in the commercial polyamic-acid compositions.

The polyamic-acid and silane applied to the substrate are heated to an appropriate temperature, for example 100 to 225° C., during a few minutes for drying of the layer or layers, and conversion of the polyamic-acid into a polyamide-imide film. A thickness of a few $\mu m$, for example 5-20 $\mu m$, is sufficient for the coating of polyamide-imide modified by silane to fulfill the purpose of the invention.

In addition, the non-stick coating composition can be applied, in conventional way, as one or several successive layers, according to the manufacturer's prescriptions. Examples of suitable coating compositions are those based on PTFE supplied by E.I. DuPont de Nemours and Co., Wilmington, Delaware, and the coating compositions based silicones supplied by Dow Corning Corp., Midland, Michigan.

Silane provides a high degree of adhesion, chemical in nature, with the substrate because of the condensation reaction of the —OH groups coming from hydrolysis of the alkoxy groups of the silane with the —OH groups of the substrate surface. On the other side, the amino groups of the silane create chemical bonds with the polyamic-acid- and consequently with the final polyamide-imide. Finally, test procedures have indicated that the non-stick coatings adhere very well to the polyamide-imide layer modified by silane.

As mentioned above, the present invention also encompasses the use of a colored precoating on a transparent glass or glass-ceramic cookware before the application of the non-stick coating. The role of this precoating is multiple; preventing the diffusion of detergents and fat toward the inside cookware surface, ensuring the adhesion of the non-stick coating, and determining colors or the decoration of the finished non-stick article.

The polyimide resin used in the present invention can be any polyimide resin.

Preferred classes of polyimide resin are, however, the polyamide-imides 1 (PAI-1) and 2 (PAI-2) defined in the Recommendation LI of the Bundesgesundheitsamt (issued as communication 160 in the Bundesgesundheitsblatt, Vol. 26, no. 7, Juillet 1983, pages 219–221) which teaches appropriate polymeric coating systems for frying, boiling and baking utensils. PAI-1 is a poly-N-(4,4'-diphenylmethane-trimellitamide-imide) prepared by reaction of 4,4'-diisocyanatodiphenylmethane with trimellitic anhydride. PAI-2 is poly-N-(4,4'-diphenyltrimellitamide methane-trimellitamide-imide) prepared by reaction of 4,4'-diaminodiphenylmethane with benzoyl chloride-3,4dicarboxylic acid anhydride.

These polyamide-imides are preferred because of their food-contact approval by the administrations of most countries.

It should be noted that these polyamide-imides 1 and 2 are described in the above-referred recommendation as bonding resins to be used in a mixture with homopolymers or copolymers of tetrafluoroethylene. Said recommendation does not suggest that these polyamide-imides can be used for forming a colored pre-coating to be overcoated with a non-stick coating.

Polyamide-imide resins (PAI-1, PAI-2) are currently supplied by WHITFORD CORPORATION (Box 507, West Chester, PA 19381, USA), WHITFORD PLASTICS Ltd. (Brindley 86, Astmoor, Runcorn, Cheshire, WA7 1PF, GB), and AMOCO CHEMICALS CORPORATION (200 East Rodolphe Drive, Chicago, Illinois, 60 601, USA), among others. An example of unpigmented polyamide-imide resin is supplied by WHITFORD PLASTICS Ltd. under the reference XYLAN 8470-0170-3320 Clear Resin (PAI-1).

The coloration oof a clear PAI resin is achieved by adding pigments giving the desired color. As examples of clear colored pigments, one can use the IRIODIN pearl lustre pigments (E. MERCK, Postfach 4119, D-6100 Darmstadt 1, WG), the ET 1024 aluminum pigment (SILBERLINE Ltd, Banbeath Industrial Estate, Leven, Fife, Scotland, KY8 5 HD, GB), etc. A darkening of the color is also possible, for example with SPEZIALSCHWARZ carbon black pigments (DEGUSSA AG, GB AC, D-6000, Frankfurt 1, WG). All the pigments cited are physiologically safe and thermally stable.

Examples of typical colors of non-stick PYREX articles prepared from several pigmented precoating compositions are given in the table A.

TABLE A

| Type of Pigment | External Color of a non-stick PYREX Article |
|---|---|
| IRIODIN 504 | Brilliant red |
| IRIODIN 530 | Brilliant bronze |
| IRIODIN 502 | Brilliant red-brown |
| IRIODIN 235 | Clear green (interference color) |
| IRIODIN 225 | Blue (interference color) |
| ET 1024 aluminum | Sparkle grey |
| IRIODIN 153 + FW6 carbon black | Sparkle dark grey |

The amount of pigments added to the clear PAI resin is a function of the desired coloring effect, of the type of pigment, of the particle size, etc. Typical formulations will be proposed in the examples of the present invention.

By using masks and silkscreen printing, decorating patterns of several colors (stars, flowers) can be designed from differently pigmented precoating compositions.

Dried thicknesses of the colored precoating between 10 to 20 μm are usually satisfactory to obtain the desired coloring effect and good barrier properties towards detergents and fat; but, of course, thicker precoatings would be useful.

Gritblasting of the glass cookware provides a suitable mechanical anchoring of the colored precoating onto the inside cookware surface. Roughness profile with an arithmetic mean (Ra) value of a few μm, for example on the order of 5 μm has been found satisfactory.

Nevertheless, the preferred process consists in adding to the precoating compositions a small amount of an amino-or polyamino-alkoxysilane (1 to 10% by weight of the colored polyimide resin composition). A chemical bonding being thus realized at the precoating/glass interface, a preliminary gritblasting is not necessary. Gritblasting has two inconveniences: it reduces the strength of the ware; and it increases the manufacturing cost.

Among the amino- or polyamino-alkoxysilanes which are well-known compounds, gamma-aminopropyltriethoxysilane (A-1100, UNION CARBIDE; 73100 SILBIONE, PHONE POULENC, etc.) is preferred, due to its relatively low price and its approval for food contact. In addition, silane release measurements, in food simulents (water, oil, alcohol, acetic acid), from coated articles have been found below 1 mg per liter (<1 ppm).

The non-stick layer or layers used can be of any type. The most currently used are produced from compositions based on polymers or copolymers of tetrafluoroethylene or on silicones. Such compositions are commercially available from various sources and their mode of application is well-known.

The present invention will be further illustrated by the following non-limiting examples. In these examples, the performance and durability of glass coated with non-stick coatings, with or without a precoating according to the present invention, were evaluated by using adhesion tests, thermal aging test, and experiments of permeability to detergents and fat.

Adhesion Tests:

Adhesion may be evaluated with the cross-hatch and the thumb nail tests after submerging the non-stick articles in boiling water for 15 minutes. After the boiling water treatment, the samples are dried and cooled to room temperature.

Cross-Hatch Test: (CHT)

The materials used are a scalpel or a razor blade, 3M's Scotch Brand 898 adhesive tape and a template having eleven parallel grooves (distance between two grooves: 2 mm). Using the template, eleven cuts are scribed through the coating, and eventually through the precoating, to the glass substrate. This procedure is repeated at right angles to produce a grid of 100 squares.

Over the scribed area, a strip of adhesive tape is pressed, the tape running parallel to one set of scribed lines. The tape is firmly rubbed with the fingernail to obtain maximum contact. Then, the tape is firmly and rapidly pulled off at a 90° angle. This last step is repeated with a fresh piece of tape after having rotated the area of 90°.

Adhesion is good if no scribed square is peeled off.

Thumb Nail Test (TNT):

This scratch test involves the use of the thumbnail to chip or peel away the coating, and eventually the precoating, from the edge of a deliberate scalpel scratch in the non-stick coating (and in the precoating). The scalpel scratch is made down to the bare glass. After the coating (and the precoating) is (are) firmly pulled away from the scratch at a 90° angle and the length of the nail track is measured.

Adhesion is considered as good if the length of the track is smaller than 6 millimetres.

Plough Test:

Since the usual tests for coatings, such as the cross hatch test and the thumb nail test, are mainly qualitative, a test designed to quantify the adhesion of the non-stick coating with the substrate is set forth below.

This test, called plough test, consists in measuring with a dynamometer, the force F necessary to remove the coating from the substrate by means of a tungsten carbide blade, the plough share, 2.5 mm long, making a 45 degree angle with the substrate, and on which a load P of 6.5 newtons is applied. To measure the coating adhesion on a substrate, one first measures the friction force $F_F$ of the blade on a part of the substrate without non-stick coating, then one measures the force $F_T$ necessary to remove the non-stick coating from the substrate when the blade is moved perpendicularly to itself at a speed of 50 $\mu$m/second. The difference $F_T - F_F = F$ measures the adhesion between the non-stick coating and the substrate. The test is made at 25 +or −2 degrees C. and at a relative humidity of 50 +or −5%. An average F is calculated from 9 measurements on three samples having an area of 5.8 ×5.8 cm.

Thermal Aging:

The thermal aging is evaluated by heating the coated samples, with or without precoating, in a stove at 250° C. for 6 days and submitting them to the adhesion tests.

Detergent Permeability

The samples are submerged in a 3 percent sodium carbonate solution (80 g of $Na_2CO_3$;10 $H_2O$ for one liter of deionized water) at 95° C. for one hour. After rinsing with cold water and drying, the coating inside of the samples and the coating or precoating/glass interface are observed. Presence of blisters, pops, delamination, permeation, staining and the like is noticed. Thereafter, adhesion tests may also be performed.

Another test consists in determining the number N of washes in a conventional dishwasher which the article can withstand before any damage appears, such as staining, delamination, peeling, of the coating, and the like. Thereafter, adhesion tests may also be performed.

Fat Permeability

The samples are filled with a thick layer of sunflower oil and placed in a stove at 200° C. for one hour. After this cooking, the samples are cooled, cleaned out and the coating or precoating/glass interface is examined. One notices the possible presence of staining or greasy spots due to the diffusion of fat down to the glass surface.

EXAMPLES

The greater efficiency of the proposed invention in comparison with the processes of the prior art is proved by the following examples.

EXAMPLE 1

In this example, we compare the adhesion of a non-stick coating, about 35 $\mu$m thick, consisting of two layers of PTFE applied by gun spraying two coats of system 458Z 62510/455Z 69801 supplied by E.I. DuPont de Nemours and Co., on clean PYREX glass articles, without any pretreatment, with the adhesion on same articles previously coated with gamma-aminopropyltriethoxysilane, abbreviated δ-APTES, at 1% v/v in 95% ethanol, and with the adhesion of same articles previously coated with an aqueous composition of polyamic-acid (chemical supplied under reference 8470 A XYLAN® with 1% v/v of δ-APTES. The silane precoating has been applied by spraying on substrates preheated at 100° C. in order to evaporate ethanol. The precoating consisting of the aqueous composition of polyamic-acid and δAPTES has been sprayed on the glass, then treated at 100 Ⓡ C. in order to convert the polyamic-acid into polyamide-imide, which is the precoating in accordance with the invention.

The adhesion force, or ploughing force, F is measured on coated samples, before and after thermal aging at 250° C.; and after 1 h and 4 h of chemical aging in the sodium carbonate solution. The results of said tests are collected in Table I; the standard deviation on the values of F in this example is 1.0 N.

TABLE I

| Treatment of the PYREX ® glass substrate | Ploughing force: F; standard deviation 1.0 N | |
|---|---|---|
| | Before Aging | After thermal aging at 250° C. |
| Nil | 4,2 | 5,6 |
| δ-APTES at 1% in ethanol at 95% | 5,4 | 5,7 |
| 8470 A XYLAN ® + 1% of δ-APTES (according to the invention) | 8,4 | 6,5 |

| Treatment of the PYREX ® glass substrate | Ploughing force: F; standard deviation 1.0 N After chemical Aging | |
|---|---|---|
| | 1 h | 4 h |
| Nil | 6,0 | 0,0 |
| δ-APTES at 1% in ethanol at 95% | 7,3 | 5,5 |
| 8470 A XYLAN ® + 1% of δ-APTES | 7,8 | 7,7 |

EXAMPLE 2

The same modus operandi as in example 1 is used except replacement 1% v/v δAP-TEST added to 8470 A YXLAN® by 5% v/v. The ploughing force F, with σ=1.0 N, reaches now more than 11.8 N before aging, (instead of 5.0 N), 9.9 N after thermal aging at 250° C, and 9.3 and 8.1 N after chemical aging of 1 h and 4 h, respectively.

EXAMPLE 3

In this example, we compare the adhesion of a non-stick coating, about 20 μm thick, consisting of a layer of silicone resins, supplied by Dow Corning Corp. under the codes 1-2531 and 6-2230, applied by spraying, then cured for 20 min. at 250°C. on clean PYREX® glass substrates, either without any pretreatment, or provided with a precoating of δ-APTES at 1% v/v, applied either as a solution in ethanol at 95% sprayed on a substrate preheated at 100°C. or as an aqueous solution sprayed on a substrate preheated at 200°C., or provided with a precoating similar to the precoating of example 2 dried at 100°C.

The adhesion force F is measured on the coated samples before and after thermal aging at 200 and 250° C., and after ¼ h, ½ h, 1 h, 2 h and 3 h of chemical aging in a sodium carbonate solution. The results are collected in Table II.

TABLE II

| Treatment of the PYREX ® substrate | Ploughing force: F; = 1,0 N | | |
|---|---|---|---|
| | Before Aging | After thermal aging 250° C. | 250° C. |
| Nil | 1,9 | 1,7 | 1,1 fissuring |
| δ-APTES at 1% in ethanol at 95% T = 100° C. | 2,8 | 2,2 | 2,0 |
| δ-APTES at 1% in water T = 200° C. | 2,5 | 2,9 | 1,7 fissuring |
| 8470 A XYLAN ® + 1% δ-APTES (according to the invention) | 5,0 | 4,7 | 2,8 |

EXAMPLE 4

The same procedure is used as in example 3, except for the thickness of the silicone non-stick coating, which is about 45 μm and for the concentration of silane in the polyamic-acid resin which is 5% v/v instead of 1%.

The results are given in Table III hereafter.

TABLE III

| Treatment of the PYREX ® glass substrate | Ploughing force: F; = 2,0 N | |
|---|---|---|
| | Before aging | After thermal aging at 200° C. |
| Nil | 4,1 | 2,1 |
| δ-APTES at 1% in ethanol at 95% T = 100° C. | 3,8 | 3,3 |
| 8470 A XYLAN ® + 5% of δ-APTES (according to the invention) | 9,8 | 8,0 |

| Treatment of the PYREX ® glass substrate | Ploughing force: F; 2,0 N After chemical aging | |
|---|---|---|
| | 1 h | 4 h |
| Nil | 4,6 | 3,5 |
| δ-APTES at 1% in ethanol at 95% T = 100° C. | 5,7 | 6,2 |
| 8470 A XYLAN ® + 5% of δ-APTES (according to the invention) | 8,2 | 7,8 |

EXAMPLE 5

The same procedure as inn example 4 is used, except for the silane concentration in the 8470 A XYLAN® precoating, which is 2.5% v/v of δAPTES instead of 5%.

The ploughing force F, with =2.0N, is here 8.9 N before aging, 9.9 N after thermal aging at 200° C., and 11.8 and 10.8 N after chemical aging for 1 h and 4 h, respectively.

EXAMPLE 6

The same procedure as in example 4 is used, except for the silane concentration in the 8470 A XYLAN® precoating, which is 1% v/v of δ-APTES instead of 5%.

The ploughing force F, with =2.0N, is here 8.1 N before aging, 7.8 N after thermal aging at 200oC, and 7.7 and 9.7 N after chemical aging for 1 h and 2 h, respectively.

EXAMPLE 7

In this example, we compare the adhesion of a non-stick coating, about 20 μm thick, made by gun spraying of a layer of 8830 XYLAN®, a non-stick coating composition based on PTFE supplied by Whitford Plastics Ltd., on PYREX® glass substrates and curing of said coating at 390° C. for 20 min.; the aforesaid substrates being either without any pretreatment, or provided with a precoating consisting in an aqueous composition of polyamic-acid (code 8470 A XYLAN®) containing 3% v/v of δ-APTES according to the conventional modus operandi described in example 1.

The adhesion force F is measured on the samples before and after thermal aging at 250oC, and after 1 h of chemical aging. The results are collected in Table IV.

TABLE IV

| Treatment of the PYREX ® glass substrate | Ploughing force: F; = 1,5 N | |
|---|---|---|
| | Before aging | After thermal aging at 250° C. |
| Nil | 6,6 | 7,3 |
| 8570 A XYLAN ® + 3% δ-APTES (according to the invention) | 10,8 | 9,5 |

| Treatment of the PYREX ® glass substrate | Ploughing force: F; = 1,5 N After chemical aging for 1 hour |
|---|---|
| Nil | 0 |
| 8570 A XYLAN ® + 3% δ-APTES (according to the invention) | 10,8 |

EXAMPLE 8

The same procedure as inn example 2 is used, except that the second layer of the PTFE coating made from the composition code 455 Z 6988001 from E.I. DuPont de Nemours and Co. is replaced by the composition code 455 Z 69800 from the same company.

The adhesion of the non-stick coating on the substrates is tested with a conventional dishwasher, and evaluated by the number on washing cycles withstood by the coating before being damaged.

| Treatment of the PYREX ® glass substrate | Number of washing cycles, N |
|---|---|
| Nil | 10 |
| 8470 A XYLAN + 5% δ-APTES (according to the invention) | >169 |

EXAMPLE 9

In this example we compare, with the cross hatch test and the thumb nail test the adhesion of non-stick coatings based on PTFE made from the compositions code 459 523 and 456 396 supplied by E.I. DuPont de Nemours and Co., applied on PYREX®glass cookware, said cookware being either without any precoating, or precoated with an aqueous composition of polyamic-acid (code 8470 XYLAN®) containing 5% v/v of N-(beta-aminoethyl)-gamma-aminopropyltriemethoxysilane. The articles provided with this precoating successfully pass both tests after 1 h of chemical aging. Contrariwise, the articles without any precoating fail, the PTFE coating being easily removed, after 1 h of chemical aging, by the thumb nail.

EXAMPLE 10

In this example we compare the adhesion of non-stick coatings based on PTFE made from compositions code 459 523 and 456 396 supplied by E.I. DuPont de Nemours and Co. on stainless steel substrates (reference Z 6 CN 18.09) previously degreased with 1.1.1-trichlorethane and then dried at 350° C., said substrates being either without any precoating or precoated with an aqueous composition of polyamic-acid (code 8470 A XYLAN®) containing 3% v/v of δ-APTES.

The samples without precoating fail the thumb nail test after 1 h of chemical aging. The samples precoated according to the invention pass the test, even after 3 h of chemical aging.

The above examples clearly demonstrate that the present invention provides means to substantially improve adhesion and durability of non-stick coatings on a variety of substrates. Moreover, processes disclosed in this invention are particularly suitable for application on an industrial scale.

EXAMPLE 11:

In this example, we compare the performance and the aspect of the PYREX articles coated with two layers of PTFE compositions supplied by E. I. Du Pont de Nemours and Co. after the usual gritblasting, and the performance and the aspect of PYREX articles precoated according to the invention, then coated with the PTFE layers.

The precoating composition was prepared by adding 6 parts by weight of IRIODIN 504 to 100 parts of XYLAN 8470-0170-3320 clear polyamide-imide resin (PAI-1 from WHITFORD). Viscosity adjustment was made by adding ethanol and water.

For mechanical adhesion of the precoating, the PYREX article is gritblasted to an arithmetic mean roughness (Ra) of about 5 μm. For chemical adhesion of the precoating, 1.25 parts of gamma-aminopropyltriethoxy-silane was added to 100 parts of the colored precoating. This precoating was directly applied after cleaning the ware with ethanol.

The different layers were applied by gun spraying in order to have a total dried PTFE film thickness of about 20 μm and a precoating thickness of about 10 μm. Precoating, drying and PTFE curing schedules are given in Table 5.

The results of the adhesion evaluation by means of a cross-hatch test (CHT) and the thumb nail test (TNT) performed before and after thermal aging, and the results of the experiments of permeability toward detergents and fat are summarized also in Table 5.

From these results it can be concluded that the PTFE coatings are very permeable to detergents and fat. On the contrary, the colored polyamide-imide precoating has very good barrier properties and good adhesion ability toward glass and PTFE coating. PYREX glassware treatments of type C and D show that the colored precoating/glass adhesion can be either mechanical or chemical in nature.

It also appears clearly that non-stick PYREX glassware precoated according to the invention exhibits a brilliant and attractive red color quite different from the dark color of the PTFE non-stick coatings supplied by E.I. Du Pont de Nemours and Co. This vivid color is not affected by staining and is not altered by thermal aging.

TABLE 5 (A)

| Cookware Treatment | PTFE Coating DuPont Reference | PTFE Curing time (min), Temperature (°C.) |
|---|---|---|
| (A) Gritblasting (Ra = 11 μm) | 1st layer 459-523 2nd layer 456-396 | 10 min. 410° C. |
| (B) Gritblasting (Ra = 5 μm) | 1st layer 459Z67303 2nd layer 456Z67302 | 10 min. 400° C. |
| (C) Gritblasting (Ra = r μm) Colored precoating Drying: 10 min. 150° C. 10 min. 200° C. | 1st layer 459Z67303 2nd layer 456Z67302 | 15 min. 380° C. |
| (D) Silylated colored precoating Drying: 10 min. 100° C. | 1st layer 459Z67303 2nd layer 456Z67302 | 10 min. 400° C. |

(C) and (D) are prepared according to the invention.

TABLE 5 (B)

| | Adhesion | | | |
|---|---|---|---|---|
| | Before | | After | |
| | Thermal Aging | | | |
| Cookware Treatment | CHT | TNT | CHT | TNT |
| (A) Gritblasting (Ra = 11 μm) | Good | Good | Good | Good |
| (B) Gritblasting (Ra = 5 μm) | Good | Good | Good | Good |
| (C) Gritblasting (Ra = 5 μm) Colored precoating Drying: 10 min, 150° C. 10 min, 200° C. | Good | Good | Good | Good |
| (D) Silylated colored precoated Drying: 10 min, 100° C. | Good | Good | Good | Good |

(C) and (D) are prepared according to the invention.

TABLE 5 (C)

| Cookware Treatment | Permeability Detergents | Fat | External Color |
|---|---|---|---|
| (A) Gritblasting (Ra = 11 μm) | Complete permeation | Complete permeation | Charcoal grey |
| (B) Gritblasting (Ra = 5 μm) | Complete permeation Blisters | Complete permeation | Dark grey |
| (C) Gritblasting (Ra = 5 μm) Colored precoating Drying: 10 min, 150° C. 10 min, 200° C. | no defect | no defect | Brilliant red |
| (D) Silylated colored precoated Drying: 10 min, 100° C. | no defect | no defect | Brilliant red |

(C) and (D) are prepared according to the invention.

EXAMPLE 12

As in example 11, we compared the performance and the aspect of PYREX glassware samples coated with two layers of PTFE compositions supplied by E.I. DuPont de Nemours and Co. under the reference 459 Z 67303 and 456 Z 673302 after the usual gritblasting, and the performance and the aspect of PYREX articles precoated according to the invention, then coated with the PTFE layers.

The precoating composition was obtained by mixing 6 parts by weight of IRIODIN 225 with 100 parts of XYLAN 8470-0170-3320 clear polyamide-imide resin (PAI-1 from WHITFORD).

An arithmetic mean roughness (Ra) of 5 μm was created by gritblasting to promote the glass/precoating mechanical adhesion. An alternative chemical adhesion has been obtained by adding 1.5 part of gamma-aminopropyltriethoxysilane to 100 parts of the colored precoating composition.

The total thickness of the PTFE layers was of 20 μm and, for the PYREX articles coated according to the invention, the precoating thickness was of 10 μm.

Three different samples were considered corresponding to the B, C and D samples of Table 5 for the drying conditions of the precoating and for the PTFE curing.

All the results concerning the adhesion evaluated with the cross-hatch test and the permeability are collected in Table 6. The external aspect of non-stick PYREX articles is also compared.

As mentioned in example 11, it can be concluded that precoated items in accordance with the invention have good adhesion properties and a good impermeability toward detergent and fat.

Blue to blue-green nuances of the precoating can be obtained by adjusting the precoating thickness (interference color).

TABLE 6

| Treated PYREX ware | Adhesion Before Thermal Aging | Adhesion After Thermal Aging | Permeability Detergents | Permeability Fat | External Color |
|---|---|---|---|---|---|
| Gritblasting (Ra = 5 μm) | good | good | complete permeation | complete permeation | Dark grey |
| Gritblasting (Ra = 5 μm) Colored precoating (according to the invention) | good | good | no defect | no defect | Blue |
| Silylated colored precoating (according to the invention) | good | good | no defect | no defect | Blue |

EXAMPLE 13:

A non-stick PYREX dish having externally a brilliant red aspect was obtained by adding 4 parts by weight of IRIODIN 504 to 100 parts of XYLAN 8470-0170-3320 clear resin. The mixing of 4.3 parts of gamma-aminopropyltriethoxysilane with 100 parts of the colored composition provided the adhesion of this precoating to the glass.

After application of this composition and drying for 10 minutes at 100oC (dried thickness: 15 μm), the two coat non-stick coating, code 459 Z 67303 and 456 Z 67302 from E.I. DuPont de Nemours and Co., was sprayed on the precoated substrate. The thickness of these two layers was, respectively, 12 and 8 μm. The curing of the coating was achieved after 10 minutes at 400° C.

Adhesion at interfaces evaluated by using CHT and TNT was found very good and durable after thermal aging.

The brilliant red color was stable after thermal aging and was not sensitive to detergent or greasy staining.

EXAMPLE 14:

An externally brilliant red non-stick PYREX bakeware was prepared as described in example 13, by adding 8 parts of IRIODIN 504 to 100 parts of XYLAN 8470-0170-3320 clear resin.

EXAMPLE 15:

With the same procedure as that of Example 13, a brilliant bronze colored non-stick PYREX bakeware was obtained by adding 8 parts of IRIODIN 530 to 100 parts of XYLAN 8470 clear resin.

EXAMPLE 16:

An externally brilliant red-brown non-stick PYREX bakeware was prepared as described in example 13, by adding 8 parts in weight of IRIODIN 502 to 100 parts of XYLAN 8470 clear resin.

EXAMPLE 17:

Similarly to examples 15 and 16, externally brilliant bronze or red-brown non-stick PYREX articles were prepared by adding, respectively, 6 parts by weight of IRIODIN 530 or IRIODIN 502 to 100 parts of XYLAN 8470 polyamide-imide clear resin.

EXAMPLE 18:

An externally clear green, non-stick PYREX bakeware was prepared as described in example 13, by adding 6 parts by weight of IRIOCINE 235 to 100 parts of XYLAN 8470 polyamide-imide clear resin (interference color).

EXAMPLE 19:

A non-stick PYREX bakeware colored in sparkle dark grey was prepared by adding carbon black and silver white IRIODIN 153 to a polyamide-imide resin of type 2 (PAI-2) from WHITFORD PLASTICS Ltd., modified with gamma-aminopropyltriethoxysilane (4.3 parts for 100 parts of colored resin.)

The non-stick coating was applied as described in example 13.

EXAMPLE 20:

A non-stick VISION frypan having a sparkle metallized grey external aspect was prepared by adding 10 parts by weight of ET 1024 SILBERLINE aluminum pigment to 100 parts of the clear polyamide-imide resin (PAI-1) from WHITFORD PLASTICS Ltd.

In this mixture was also added 4,3 parts by weight of gamma-aminopropyltriethoxysilane per 100 parts of colored resin. After spraying and drying of this precoating, the fluorinated non-stick coating was applied as in example 13.

EXAMPLE 21:

By using masks and silkscreen printing, decorating patterns of several colors (stars, flowers) were obtained with a silane-modified polyamide-imide layer differently pigmented. The non-stick coating was then applied on the multicolored precoating as described in example 13.

EXAMPLE 22:

A bakeware was coated with a silicone resin obtained by mixing 10 parts by weight of 6-2230 resin in 100 parts of Q1-2531 (resins supplied by Dow Corning Co.). Aluminum pigment (sparkle silver 5000 AR, SILBERLINE) and carbon black were added to color in grey the non-stick coating.

This coating was applied on a brilliant red precoated bakeware, the precoating being composed of XYLAN 8470 clear resin (PAI-1) containing 7.1% by weight of IRIODIN 534 and 3.8% by weight of gamma-aminopropyltriethoxysilane.

Drying of the precoating and curing of the non-stick coating were achieved at 150oC and 250oC, respectively.

The aspect of the finished non-stick bakeware was thus grey inside and brilliant red outside. Precoating and non-stick coating adhesion was found very good and durable after the thermal aging. The aspect of this item was stable, durable and not sensitive to the action of detergents and fat.

The above examples clearly demonstrate that the present invention provides means to produce non-stick glass and glass-ceramic ware having clear, vivid, brilliant, attractive colors and stable and durable decorating patterns. For transparent substrates, an infinite number of color nuances and of decorating possibilities can be created. The decorating effects and colors are not sensitive to detergents and fat staining, given the perfect imperviousness of the pigmented polyimide precoating. Furthermore, the precoating compositions have a good adhesion ability toward non-stick coatings. Thus, the precoating properties insure a good durability of the aspect and of the performances of the non-stick glass ware made according to the present invention. Moreover, the compositions and the processes disclosed are particularly suitable for application on an industrial scale.

The present invention has been particularly shown and described with reference to preferred embodiments thereof; however, it will be understood by those skilled in the art that various changes in the form and details may be made therein, and by using technical equivalents, without departing from the true spirit and scope of the invention as defined by the following claims.

We claim:

1. Article comprising of a transparent glass or glass ceramic substrate, and of at least one layer of a non-stick polymer covering at least partially said substrate, wherein a pigmented polyimide layer is applied between said substrate and said non-stick polymer.

2. Article according to claim 1, wherein said pigmented polyimide layer further comprises an organosilane chemically bound to -OH groups of the substrate surface and to said polyimide layer.

3. Article according to claim 1 or 2, wherein said polyimide is a polyamide-imide of type 1.

4. Article according to claim 1 or 2, wherein said polyimide is a polyamide-imide of type 2.

5. Article according to claim 1 or 2, wherein the polyimide layer that contains a pigment allowing the development of a clear, vivid, brilliant, attractive color.

6. Article according to claim 1 or 2, wherein said non-stick polymer is a fluorocarbon or a silicone polymer.

7. Article according to claim 1 or 2, wherein it is cookware.

* * * * *